(12) United States Patent
Yanakiev et al.

(10) Patent No.: US 8,769,937 B2
(45) Date of Patent: Jul. 8, 2014

(54) SOOT SENSOR MONITORING

(75) Inventors: Ognyan N. Yanakiev, Birmingham, MI (US); David E. Winn, Birmingham, MI (US); Eric M. Hall, Rochester Hills, MI (US); Christopher P. Musienko, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 204 days.

(21) Appl. No.: 13/362,736

(22) Filed: Jan. 31, 2012

(65) Prior Publication Data

US 2013/0192214 A1   Aug. 1, 2013

(51) Int. Cl.
*F01N 3/00* (2006.01)
*F01N 3/02* (2006.01)
*G01N 7/00* (2006.01)
*G01N 33/497* (2006.01)

(52) U.S. Cl.
USPC ............... 60/295; 60/276; 60/277; 60/311; 73/23.33

(58) Field of Classification Search
USPC ......... 60/276, 277, 295, 311; 73/23.33, 28.01
See application file for complete search history.

(56) References Cited

FOREIGN PATENT DOCUMENTS

JP   2010275977 A   * 12/2010   ............... F01N 3/02

* cited by examiner

*Primary Examiner* — Audrey K Bradley
(74) *Attorney, Agent, or Firm* — Cantor Colburn LLP

(57) ABSTRACT

A control method for monitoring a soot sensor of an exhaust treatment system is provided. The control method includes: determining when regeneration has completed; comparing soot sensor data to an estimated soot data based on the determining; and generating a message based on the comparing.

20 Claims, 3 Drawing Sheets

SOOT SENSOR MONITORING

FIELD OF THE INVENTION

The subject invention relates to methods, and systems for monitoring the operation of a soot sensor of a particulate filter.

BACKGROUND

Exhaust gas emitted from an internal combustion engine, particularly a diesel engine, is a heterogeneous mixture that contains gaseous emissions such as carbon monoxide ("CO"), unburned hydrocarbons ("HC") and oxides of nitrogen ("NOx") as well as condensed phase materials (liquids and solids) that constitute particulate matter. Catalyst compositions typically disposed on catalyst supports or substrates are provided in an engine exhaust system to convert certain, or all of these exhaust constituents into non-regulated exhaust gas components.

Sensors are provided in the engine exhaust system to measure the levels of observable conditions in the exhaust system. In particular, a soot sensor can be disposed within the engine exhaust system to measure the soot levels in the particulate filter. The internal combustion engine is controlled based on the soot sensor readings to reduce the level of soot. Thus, proper operation of the engine is based on proper operation of the soot sensor.

Accordingly, it is desirable to provide systems and methods for monitoring the functionality of the soot sensors to ensure proper operation.

SUMMARY OF THE INVENTION

In one exemplary embodiment, a control method for monitoring a soot sensor of an exhaust treatment system is provided. The control method includes: determining when regeneration has completed; comparing soot sensor data to an estimated soot data based on the determining; and generating a message based on the comparing.

In another exemplary embodiment, a control system that monitors a soot level sensor of an exhaust treatment system is provided. The control system includes a first module that determines when regeneration has completed. A second module compares soot sensor data to an estimated soot data based on the determining. A third module generates a message based on the comparing.

In yet another exemplary embodiment, an exhaust system of an engine is provided. The exhaust system includes a particulate filter and a soot level sensor disposed in proximity to the particulate filter. A control module determines when regeneration has completed, compares soot sensor data to an estimated soot data based on the determining, and generates a message based on the comparing.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
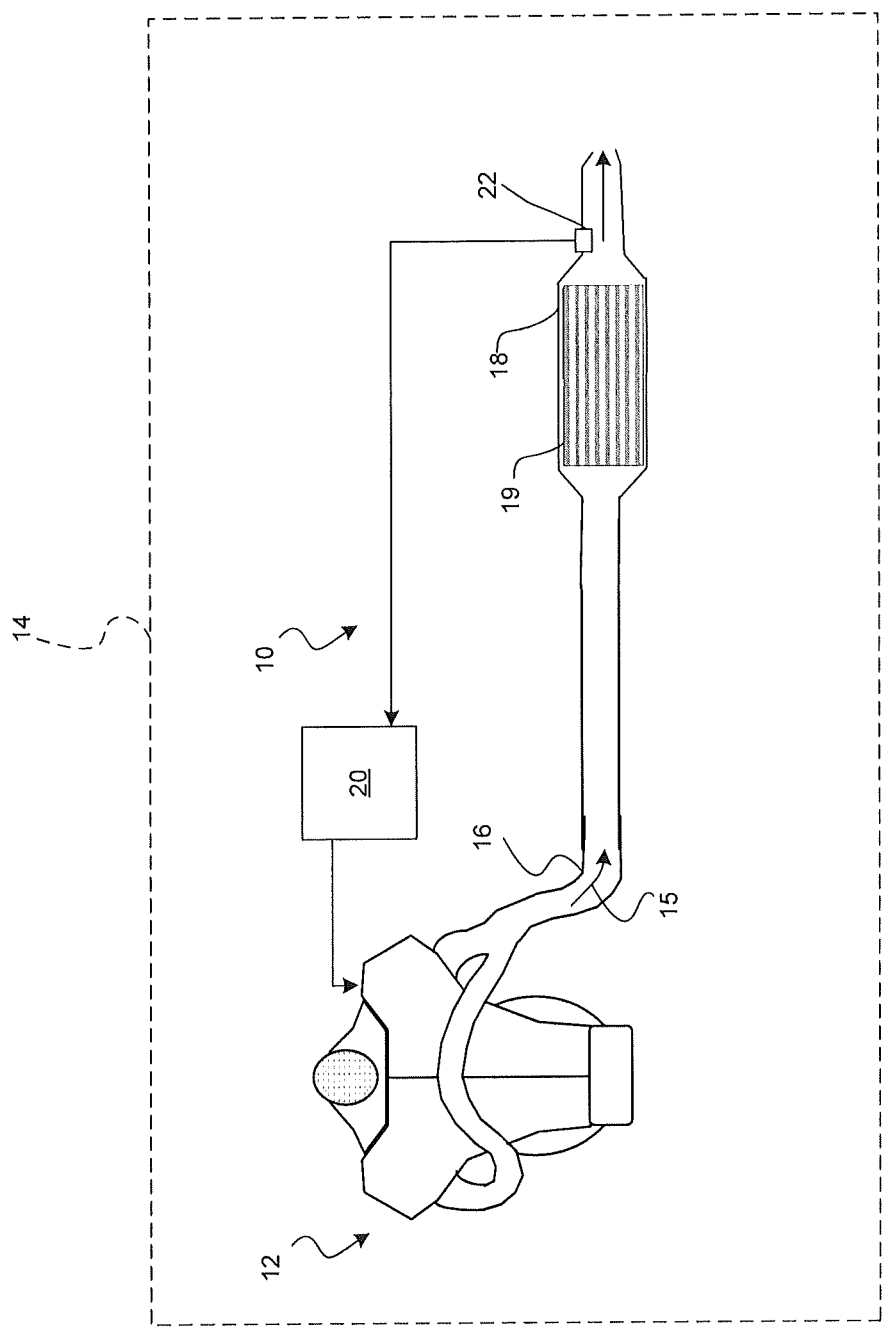
FIG. 1 is a functional block diagram of a vehicle including an exhaust system in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, exemplary embodiments are directed to an exhaust gas treatment system 10, for the reduction of regulated exhaust gas constituents of an internal combustion engine 12 of a vehicle 14. As can be appreciated, the engine 12 can be of any engine type including, but not limited to, a diesel engine, a gasoline direct injection engine, a homogeneous charge compression ignition engine, or other engine type.

The exhaust gas treatment system 10 generally includes one or more exhaust gas conduits 16, and one or more exhaust treatment devices. In various embodiments, the exhaust treatment devices can include a particulate filter 18 and an oxidation catalyst device, a selective catalytic reduction device, and/or other treatment device.

In FIG. 1, the exhaust gas conduit 16, which may comprise several segments, transports exhaust gas 15 from the engine 12 to the various exhaust treatment devices of the exhaust gas treatment system 10. The exhaust treatment devices operate to filter the exhaust gas of emissions and particulate matter. The particulate filter 18, in particular, operates to filter the exhaust gas 15 of carbon and other particulates. In various embodiments, the particulate filter 18 may be constructed using a wall flow monolith filter 19 or other filter devices such as wound or packed fiber filters, open cell foams, sintered metal fibers, etc. The filter 19 may be packaged in a shell or canister that is, for example, stainless steel, and that has an inlet and an outlet in fluid communication with exhaust gas conduit 16.

The accumulation of particulate matter within the particulate filter 18 is periodically cleaned, or regenerated. Regeneration involves the oxidation or burning of the accumulated carbon and other particulates in what is typically a high temperature (>600° C.) environment.

A control module 20 controls the engine 12 and/or one or more exhaust components based on sensed and/or or modeled data. The sensed data can be received from one or more sensors 22 of the exhaust treatment system 10. In particular, at least one soot sensor 22 senses the amount of soot, for example, downstream of the particulate filter 18. As can be appreciated, multiple soot sensors 22 can be disposed within the exhaust treatment system 10, for example upstream and/or or downstream of the particulate filter 18.

In various embodiments, the control module 20 monitors the operation of the soot sensor 22 or other soot sensor and diagnoses the operation of the soot sensor 22 or other soot sensor after a regeneration event of the particulate filter 18. For example, the control module 20 determines when a regeneration event has completed and evaluates the soot sensor signal based on an estimated soot level. The control module 20 can set a diagnostic code based on the evaluation. The control module 20 can further report the diagnostic code according to various reporting methods, including, but not limited to, using in-vehicle communication reporting messages and/or off-vehicle reporting messages.

Figure 2:
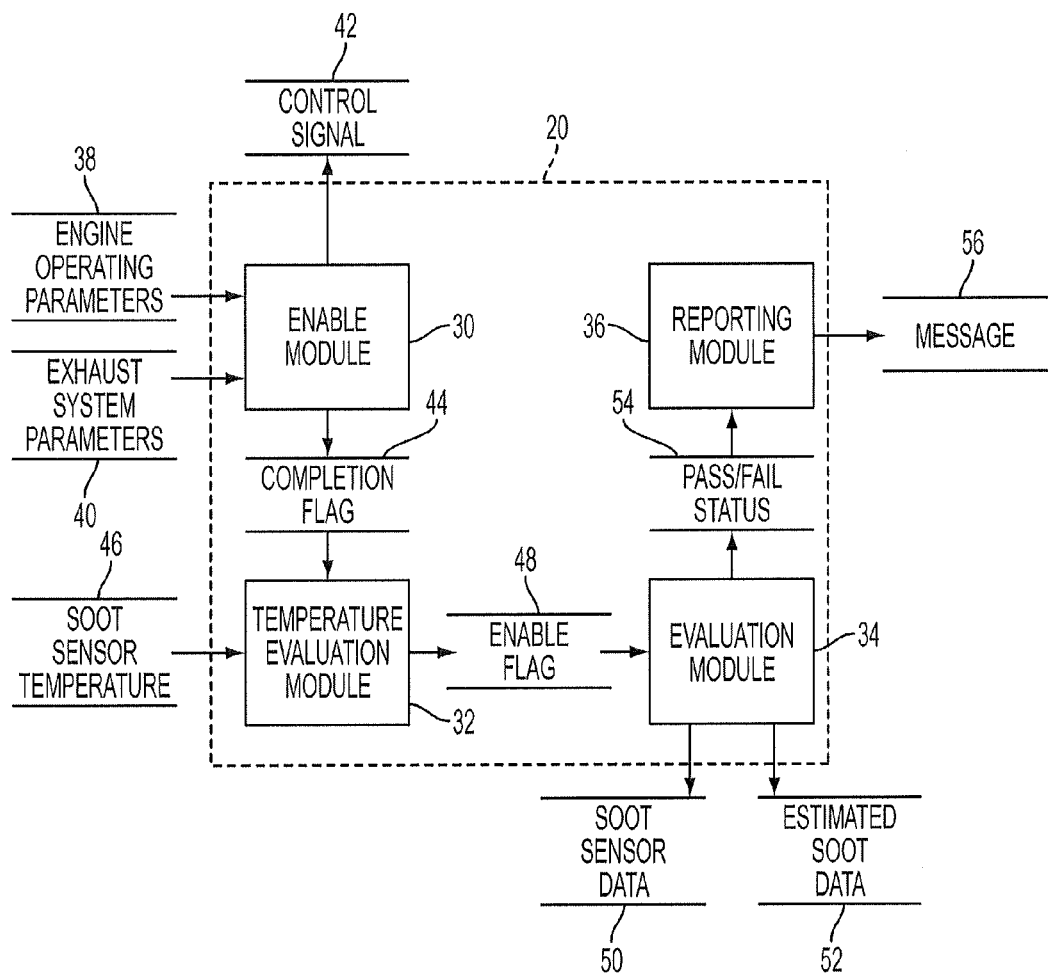
FIG. 2 is a dataflow diagram illustrating sensor monitoring system of the exhaust system in accordance with exemplary embodiments.

Referring now to FIG. 2, a dataflow diagram illustrates various embodiments of a sensor monitoring system that may be embedded within the control module 20. Various embodiments of sensor monitoring systems according to the present disclosure may include any number of sub-modules embedded within the control module 20. As can be appreciated, the sub-modules shown in FIG. 2 may be combined and/or further partitioned to similarly monitor sensor operation of soot sensor 22 (FIG. 1). Inputs to the system may be sensed from sensors (not shown) within the vehicle 14, received from other control modules (not shown), and/or determined/modeled by other sub-modules (not shown) within the control module 20. In various embodiments, the control module 20 includes an enable module 30, a temperature threshold module 32, an evaluation module 34, and a reporting module 36.

The enable module 30 receives as input engine operating parameters 38 and/or exhaust system parameters 40. Based on the parameters 38, 40, the enable module 30 determines whether regeneration of the particulate filter 18 (FIG. 1) is needed and initiates regeneration of the particulate filter 18 (FIG. 1) by generating control signals 42 to the engine 12 (FIG. 1) or other exhaust system component according to various regeneration methods known in the art. In various embodiments, regeneration may be needed, for example, after a certain time of engine operation has elapsed, or when engine operating conditions create certain exhaust flow characteristics that create excessive soot.

The enable module 30 monitors the exhaust system parameters 40 to determine when the regeneration is complete. The enable module 30 sets a completion flag 44 based on whether the regeneration is complete. For example, the enable module 30 sets the completion flag 44 to TRUE or the value one when the regeneration has completed and sets the completion flag 44 to FALSE or the value zero when the regeneration has not completed.

The temperature evaluation module 32 receives as input the completion flag 44 and a soot sensor temperature 46. Based on the inputs 44, 46, the temperature evaluation module 32 sets an enable flag 48. For example, when the completion flag 44 indicates that the regeneration is complete and the soot sensor temperature 46 is less than a predetermined threshold, the temperature evaluation module 32 sets the enable flag 48 to TRUE or one. In another example, when the completion flag 44 indicates that the regeneration is not complete or the soot sensor temperature 46 is greater than or equal to the predetermined threshold, the temperature evaluation module 32 sets the enable flag 48 to FALSE or zero.

The evaluation module 34 receives as input soot sensor data 50, estimated soot data 52, and the enable flag 48. As can be appreciated, the estimated soot data 52 can be determined as a function of initial particulate filter efficiency and an estimated soot generated from the engine 12 (FIG. 1). Based on the inputs 48-52, the evaluation module 34 sets a pass/fail status 54. For example, when the enable flag 48 indicates that the monitoring is enabled, the evaluation module 34 compares the soot sensor data 50 with the estimated data 52 to determine if the soot sensor 22 (FIG. 1) is operating as expected. If the soot sensor 22 (FIG. 1) is operating as expected, the evaluation module 34 sets the pass/fail status 54 to PASS. If, however, the soot sensor 22 (FIG. 1) is not operating as expected, the evaluation module 34 sets the pass/fail status 54 to FAIL.

The reporting module 36 receives as input the pass/fail status 54. Based on the pass/fail status 54, the reporting module 36 sets the value of a diagnostic code associated with the soot sensor 22 (FIG. 1) and reports the diagnostic code. In various embodiments, the diagnostic code can be reported by generating a message 56 on a serial data bus (not shown) of the vehicle 14 (FIG. 1), where the message 56 can be transmitted to a remote location using a telematics system (not shown) of the vehicle 14 (FIG. 1) or can be retrieved by a technician tool (not shown) connected to the vehicle 14 (FIG. 1).

Figure 3:
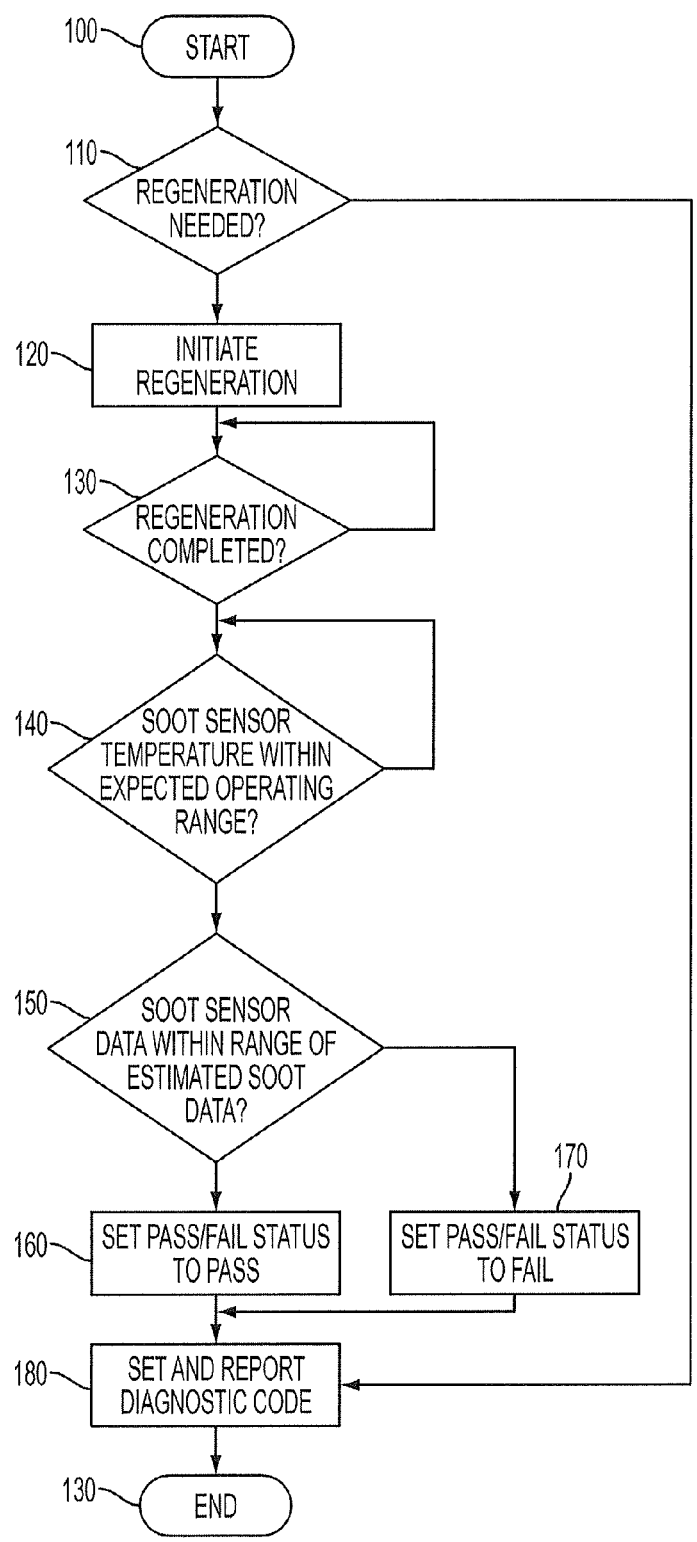
FIG. 3 is a flowchart illustrating a sensor monitoring method that may be performed by the exhaust system in accordance with exemplary embodiments.

Referring now to FIG. 3, and with continued reference to FIGS. 1 and 2, a flowchart illustrates sensor monitoring method that can be performed by the control module 20 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or run continually during operation of the engine 12.

In one example, the method may begin at 100. It is determined whether regeneration is needed at 110. If regeneration is needed at 110, regeneration is initiated at 120. Otherwise the method may end at 130.

After regeneration is initiated at 120, it is determined whether regeneration has completed at 130. If regeneration is completed at 130, the soot sensor temperature 46 is evaluated at 140. If, however, regeneration has not yet completed at 130, the method continues with evaluating the regeneration at 130.

After regeneration has completed at 130, it is determined whether the soot sensor temperature 46 is within an expected operating range. For example, it is determined whether the soot sensor temperature 46 is below a predetermined threshold (e.g., 500 degrees Celsius) at 140. If the soot sensor temperature 46 is below the predetermined threshold at 140, the soot sensor data 50 and the estimated soot data 52 are evaluated at 150. If however, the soot sensor temperature 50 is greater than or equal to the predetermined threshold at 140, the method continues with evaluating the soot sensor temperature 46 until becomes within the range at 140.

If, at 150, the soot sensor data 50 is within a range of the estimated soot data 52, it is determined that the soot sensor 22 is operational and the pass/fail status 54 is set to PASS at 160. If, at 150, the soot sensor data 50 is outside of the range of the estimated soot data 52, it is determined that the soot sensor 22 is not operational and the pass/fail status 54 is set to FAIL at 170. Thereafter, a diagnostic code may be set and reported at 180 and the method may end at 130.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A control method for monitoring a soot sensor of an exhaust treatment system of a vehicle, comprising:
   determining when regeneration has completed;
   comparing soot sensor data to an estimated soot data based on the determining, wherein the estimated soot data is based on particulate filter efficiency and an estimated soot generated from an engine of the exhaust treatment system;
   generating a message based on the comparing; and
   connecting at least one of a telematics system and a technician tool to the vehicle for retrieving the message.

2. The control method of claim 1 wherein the comparing is performed when the regeneration has completed.

3. The control method of claim 1 further comprising evaluating a temperature of the soot sensor and wherein the comparing the soot sensor data to the estimated soot data is based on the evaluating.

4. The control method of claim 3 wherein the comparing is performed when the temperature of the soot sensor is below a predetermined threshold.

5. A control system that monitors a soot sensor of an exhaust treatment system, comprising:
   a first module implemented by at least one processor and configured to determine when regeneration has completed;
   a second module implemented by the least one processor and configured to compare soot sensor data to an estimated soot data based on the determining, wherein the estimated soot data is based on particulate filter efficiency and an estimated soot generated from an engine of the exhaust treatment system; and
   a third module implemented by the at least one processor and configured to generate a message based on the comparing.

6. The control system of claim 5, wherein the second module is configured to compare the soot sensor data to the estimated soot data when the regeneration has completed.

7. The control system of claim 5, wherein the generated message is a diagnostic code for diagnosing the soot sensor.

8. The control system of claim 5, wherein the third module is further configured to transmit the message to a remote location using a telematics system.

9. The control system of claim 5, wherein the message is retrieved by a technician tool connected to a vehicle that includes the exhaust treatment system.

10. The control system of claim 5, wherein the message comprises an off-vehicle reporting message.

11. The control system of claim 5 further comprising a fourth module implemented by the at least one processor and configured to evaluate a temperature of the soot sensor, wherein the second module is configured to compare the soot sensor data to the estimated soot data based on the evaluating by the fourth module.

12. The control system of claim 11, wherein the second module is configured to compare the soot sensor data to the estimated soot data when the soot sensor temperature is below a predetermined threshold.

13. An exhaust system of an engine, comprising:
    a particulate filter;
    a soot sensor disposed in proximity to the particulate filter; and
    a control module implemented by at least one processor and configured to:
    determine when regeneration has completed;
    compare soot sensor data to an estimated soot data based on the determining, wherein the estimated soot data is based on particulate filter efficiency and an estimated soot generated from an engine of the exhaust system; and
    generate a message based on the comparing.

14. The exhaust system of claim 13, wherein the control module is configured to compare the soot sensor data to the estimated soot data when the regeneration has completed.

15. The exhaust system of claim 13, wherein the generated message is a diagnostic code for diagnosing the soot sensor.

16. The exhaust system of claim 13, wherein the control module is further configured to transmit the message to a remote location using a telematics system.

17. The exhaust system of claim 13, wherein the message is retrieved by a technician tool connected to a vehicle that includes the exhaust system.

18. The exhaust system of claim 13, wherein the message comprises an in-vehicle communication reporting message.

19. The exhaust system of claim 13, wherein the control module is configured to evaluate a temperature of the soot sensor and compare the soot sensor data to the estimated soot data based on the evaluating.

20. The exhaust system of claim 19, wherein the control module is configured to compare the soot sensor data to the estimated soot data when the temperature of the soot sensor is below a predetermined threshold.

* * * * *